United States Patent Office 3,591,593
Patented July 6, 1971

3,591,593
1-PHENYLALKYL-3-BENZOYL-4-HYDROXY-4-PHENYL SUBSTITUTED PIPERIDINES
Kurt Thiele and Walter von Bebenburg, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed July 9, 1968, Ser. No. 743,297
Claims priority, application Germany, Nov. 2, 1967, D 54,500
Int. Cl. C07d 29/20
U.S. Cl. 260—294.7D    13 Claims

ABSTRACT OF THE DISCLOSURE

Substituted piperidines of the formula

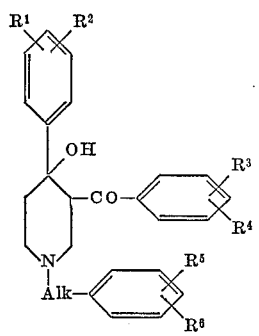

and their acid addition salts and their quaternary ammonium salts and their diastereomers and optically active isomers having pharmaceutical activity for treatment of heart and circulatory conditions and especially for increasing the coronary blood flow partly in combination with an improvement of the heart function wherein:

Alk is a straight or branch chained saturated aliphatic hydrocarbon or hydroxy substituted hydrocarbon chain of 2–4 carbon atoms;

Each of $R^1$–$R^6$ is selected from the group consisting of hydrogen, halogen, nitro, hydroxy, lower alkoxy, lower alkyl or lower trifluoroalkyl and each pair of $R^1$ and $R^2$, $R^3$ and $R^4$ and $R^5$ and $R^6$ on the phenyl rings when taken together can be lower alkylene dioxy, which are prepared by (a) Reacting one mol of a compound of the formula

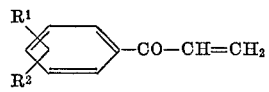

or the corresponding Mannich compound of the formula

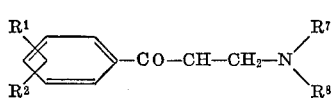

wherein $R^7$ and $R^8$ are lower alkyl with one mol of a compound of the formula

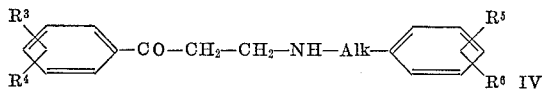

or reacting 2 mol of a compound of the Formula II or the Formula III with one mol of a compound of the formula

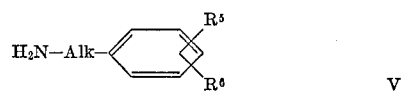

or heating a compound of the formula

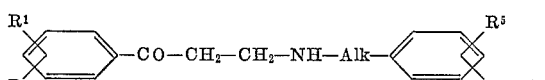

in an inert medium.

(b) Reacting one mol of a compound of the formula

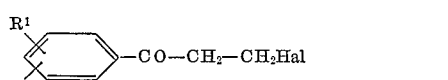

wherein Hal is Cl or Br with one mol of a compound of the Formula IV or reacting 2 mol of a compound of the Formula VII with 1 mol of a compound of the Formula V in the presence of an acid acceptor.

(c) Reacting 2 mol of a compound of the formula

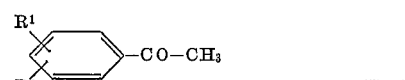

with one mol of a compound of the Formula V and formaldehyde or a formaldehyde yielding substance and, if desired, forming the acid addition or quaternary ammonium salts of the compounds produced.

DESCRIPTION OF THE INVENTION INCLUDING PREFERRED EMBODIMENTS

The novel compounds according to the invention of the formula

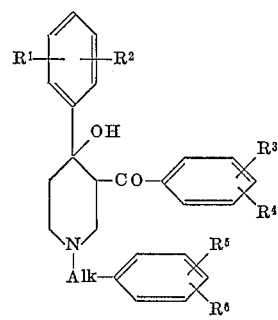

wherein $R^1$–$R^6$ and Alk have the same significance as above can be prepared by the following methods:

(a) Reacting an unsaturated ketone of the Formula II usually at lower temperatures, for example, between 0 and 50° C., expediently in an inert solvent such as ether, dioxane, acetone, chloroform and the like, with a compound of the Formula IV or reacting the Mannich compound of the Formula III with a compound of the Formula IV, usually at higher temperatures of, for example, 70–140° C. as the Mannich compound intermediately decomposes to the unsaturated ketone II, in a solvent such as water, water alcohol or a 2-phase system such as water-benzene or heating a compound of the Formula VI under essentially the same conditions as when compounds of the Formulas III and IV are reacted as the compound of Formula VI in this case essentially act as a Mannich compound whereby one portion decomposes to form the unsaturated ketone of the Formula II which then reacts with the remaining portion of the compound of Formula VI.

(b) Reacting one mol of a compound of Formula VII with one mol of a compound of Formula IV or reacting 2 mol of a compound of the Formula VIII with one mol of a compound of the Formula V in the presence of basic reacting substances such as alkali metal alcoholates, alkali metal carbonates or bicarbonates, alkali metal or alkaline earth metal hydroxide or tertiary amines, expediently at temperatures between 40 and 140° C. and in the presence of solvents such as alkanols, dioxane, dimethyl formamide.

(c) Reacting 2 mol of a compound of Formula VIII with one mol of a compound of Formula V together with formaldehyde or a formaldehyde yielding substance usually at a temperature between 60 and 140° C. in the presence of solvents such as alcohols, acetic acid and dioxane or in the absence of solvents.

The compounds according to the invention which contain optically active carbon atoms which usually are obtained as racemates can be separated into their optically active isomers or diastereomers by the normal methods. However, optically active isomers or diastereomers can also be used as starting materials.

The compounds according to the invention can be converted to their pharmacologically acceptable acid addition salts or quaternary ammonium salts with the aid of such pharmacologically acceptable acids such as acetic, succinic, maleic, fumaric, lactic, hydrochloric, hydrobromic, sulfuric, phosphoric acids or quaternizing compounds such as the lower alkyl halides.

The compounds according to the invention possess valuable pharmaceutical properties and are suited for the treatment of heart and circulatory conditions and especially for increasing the coronary blood flow partly in combination with an improvement in the heart function. In addition, such compounds have an analgesic action. The compounds were tested on the isolated guinea pig heart following the method of Langendorff (Pflüger's Arch. 61, 291, 1895) for their activity on coronary blood flow, contraction amplitude and heart frequency. The analgesic activity was demonstrated on mice according to the method of Haffner (Dtsch. med. Wschr. 55, 731, 1929). Their toxicity (LD 50 mg./kg.) was tested on mice upon oral application by the method of Miller and Tainter (Proc. Soc. exper. Biol. a. Med. 57, 261, 1944).

The compounds according to the invention produce a moderate to strong dilation of the coronary system partly with a simultaneous increase in contraction amplitude in a dosage range of 10–500 μg./heart.

The administration of the compounds according to the invention is by the standard modes for administration of compounds which are active in improving coronary blood circulation, such as, for example, enteral, parenteral, oral or perlingual. The dosage rate upon intravenous administration to animals, for example, is in the range of about 0.5–50 mg./kg.

An additional analgesic action of the compounds according to the invention was found upon oral administration in the dosage range of 50–800 mg./kg. The acute toxicity of the compounds, expressed as LD 50 mg./kg., is within the range of 500 to over 6000 mg./kg.

The following examples are illustrative of the compounds according to the invention and the methods of their preparation.

EXAMPLE 1 d,1-1-[1-phenyl-propyl-(2)]-3-benzoyl-4-hydroxy-4-phenyl piperidine

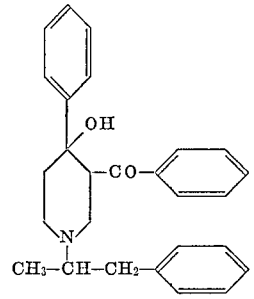

(a) 23.3 g. (0.075 mol) of d,1-β-[1-phenyl-propyl-(2)-amino]-propiophenone were dissolved in 150 ml. of acetone and a solution of 16.7 g. (0.126 mol) of acrylophenone in 50 ml. of acetone added thereto. The mixture was allowed to stand for 2 days. After filtering the solution was acidified with isopropanolic HCl whereupon the HCl salt precipitated. Melting point 221–222° C. (recrystallized from 96% acetic acid), yield 8 g.

(b) 7 g. (0.026 mol) of d,1-β-[1-phenyl-propyl-(2)-amino]-propiophenone were dissolved in 100 ml. of propanol and a solution of 4.8 g. (0.0287 mol) of β-chloro-propiophenone in 20 ml. of propanol added thereto and the mixture heated for 1 hour at 50° C. Upon standing overnight 3 g. of the HCl salt crystallized out. Melting point 221–222° C. (recrystallized from 96% acetic acid).

EXAMPLE 2

1-1-[1-phenyl-1-hydroxy-propyl-(2)]-3-benzoyl-4-hydroxy-4-phenyl-piperidine 32 g. (0.1 mol) of 1-β-[1-phenyl-1-hydroxy-propyl-(2)-amino]-propiophenone in 200 ml. of acetone were reacted with 18.9 g. (0.143 mol) of acrylophenone in 50 ml. of acetone and processed as described in Example 1(a). Yield 19 g. Melting point 195–197° C. (recrystallized from methanol).

EXAMPLE 3 d,1-1-(2-phenyl-2-hydroxy-ethyl)-3-(3-nitro-benzoyl)-4-hydroxy-4-(3-nitro-phenyl)-piperidine

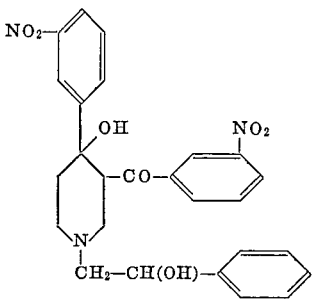

41.1 g. (0.3 mol) of d,1-2-phenyl-2-hydroxy-ethyl amine were dissolved in 20 ml. of isopropanol and neutralized with isopropanolic HCl, then 49.5 g. (0.3 mol) of 3-nitro-acetophenone and 18 g. (0.6 mol) of paraformaldehyde were added and the mixture boiled for 2 hours under reflux. Thereafter, the solvent was distilled off and the residue stirred up once with water and twice with ether and then caused to crystallize with acetone. Yield 8 g. Melting point 188–190° C. (recrystallized from methanol).

EXAMPLE 4

1-1-[1-phenyl - 1 - hydroxy-propyl-(2)] - 3 - (3-methoxybenzoyl) - 4 - hydroxy - 4 - (3-methoxyphenyl)-piperidine (a) 45 g. (0.14 mol) of 1-β-[1-phenyl-1-hydroxy-propyl-(2)-amino]-3-methoxy-propiophenone were dissolved in 300 ml. of benzene and 46 g. (0.19 mol) of β-dimethylamino-3-methoxy-propiophenone·HCl dissolved in 200 ml. of water added thereto and the mixture heated on a water bath for 3 hours while stirring vigorously. Thereafter the benzene phase was separated off, dried with potassium carbonate and acidified with isopropanolic HCl. After filtering off the unconverted starting material, the solvent was distilled off and the residue dissolved in acetone and the hydrochloride precipitated out with ether and caused to crystallize with ethyl acetate. Yield 12 g. Melting point 163–165° C. (recrystallized from ethanol).

(b) 32 g. (0.1 mol) of 1-β-[1-phenyl-1-hydroxy-propyl-(2)-amino]-3-methoxy propiophenone were heated on a water bath in 200 ml. of benzene and 100 ml. of water for 5 hours while vigorously stirring. Thereafter the benzene phase was separated off, the solvent distilled off and the residue dissolved in acetone. After acidification with isopropanolic HCl the unconverted starting material was filtered off and then ether was added to the filtrate. The hydrochloride crystallized out after standing overnight. Yield 6 g. Melting point 163–165° C. (recrystallized from ethanol).

EXAMPLE 5 d,l-1-{2 - [benzodioxane-(1,4)-yl-(6)]-2-hydroxy-ethyl}-3-(3-methoxy-benzoyl) - 4 - hydroxy - 4 - (3-methoxyphenyl)-piperidine

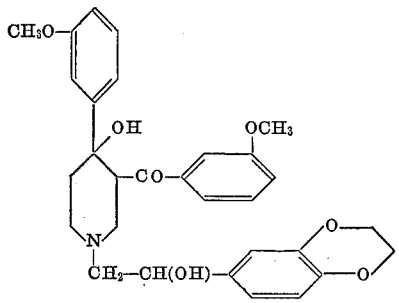

9.7 g. (0.05 mol) of d,l-2-[benzodioxane-(1,4)-yl-(6)]-2-hydroxy-ethylamine were dissolved in 100 ml. of benzene, 24.3 g. (0.1 mol of β-dimethylamino-3-methoxy-propiophenone. HCl in 100 ml. of water added thereto and the mixture heated on a water bath for 2 hours while stirring vigorously. Thereafter the benzene phase was separated off, the benzene distilled off therefrom and the residue dissolved in ether. The hydrochloride was precipitated out with isopropanolic HCl and caused to crystallize with ether. Yield 5 g. Melting point 175–176° C. (recrystallized from methyl ethyl ketone).

EXAMPLE 6 d,l-1-[1 - (3,4-dimethoxy)-phenyl-1-hydroxy-ethyl)-(2)]-3-benzoyl-4-hydroxy-4-phenyl-piperidine 9.8 g. (0.05 mol) of d,l-2-(3,5-dimethoxy-phenyl)-2-hydroxy-ethylamine and 16.8 g. (0.1 mol) of β-chloropropiophenone in 50 ml. of butanol-(2) with 25 g. of potassium carbonate were heated on a water bath for 2 hours. Thereafter the reaction mixture was boiled out with 100 ml. of isopropanol; filtered hot, and the residue washed with water until alkali free and then dissolved in acetone. The hydrochloride was precipitated from this solution with isopropanolic HCl. Yield 9 g. Melting point 172–173° C. (recrystallized from ethanol).

EXAMPLE 7 d,l-1-(2-phenyl - 2 - hydroxy-ethyl)-3-(3-methoxy-benzoyl)-4-hydroxy-4-(3-methoxy-phenyl)-piperidine (a) 13.7 g. (0.1 mol) of d,l-2-phenyl-2-hydroxy-ethylamine dissolved in 20 ml. of ethanol were heated on a water bath together with a solution of 48.7 g. (0.2 mol) of β-dimethylamino - 3 - methoxy-propiophenone·HCl in 100 ml. of water for 3 hours. The oily base which was produced was taken up in ether and converted to the hydrochloride with isopropanolic HCl. Yield 11 g. Melting point 181–182° C. (recrystallized from ethanol).

(b) 13.7 g. (0.1 mol) of d,l-2-phenyl-2-hydroxy-ethylamine were dissolved in 50 ml. of isopropanol and neutralized with isopropanolic HCl. Then 15 g. (0.1 mol) of 3-methoxy-acetophenone and 4.5 g. (0.15 mol) of paraformaldehyde were added and the mixture boiled under reflux for 15 hours. After standing for 3 days the hydrochloride precipitated out. Yield 5 g. Melting point 181–182° C. (recrystallized from ethanol).

EXAMPLE 8

1-1-[1-phenyl-1-hydroxy-propyl-(2)-]-3-benzoyl-4-hydroxy-4-(3-methoxy-phenyl)-piperidine Acrylophenone (freshly prepared from 65 g.=0.3 mol of β-dimethylamino-propiophenone·HCl) was added to a solution of 31.5 g. (0.1 mol) of 1-β-[1-phenyl-1-hydroxy-propyl-(2)-amino] - 3 - methoxy-propiophenone in 300 ml. of chloroform and the mixture allowed to stand 20 hours at room temperature. The reaction mixture was then acidified with isopropanolic HCl and the resulting HCl salt precipitated with ether and then washed with hot acetone. Yield 15 g. Melting point 173–180° C.

EXAMPLE 9 d,1-1-(2-phenyl-2-hydroxy-ethyl)-3-(4-fluoro-benzoyl)-4-hydroxy-4-(4-fluoro-phenyl)-piperidine 6.9 g. (0.05 mol) of d,l-2-phenyl-2-hydroxy-ethylamine in 50 ml. of benzene were heated together with 23.1 g (0.1 mol) of β - dimethylamino - 4 - fluoro - propiophenone·HCl in 50 ml. of water on a water bath for 5 hours while stirring vigorously. Thereafter the benzene phase was acidified with isopropanolic HCl whereupon the HCl salt precipitated. Yield 6 g. Melting point 196–197° C.

EXAMPLE 10

1-phenethyl-3-benzoyl-4-hydroxy-4-phenyl-piperidine 12.1 g. (0.1 mol) of phenethylamine dissolved in 20 ml. of ethanol were heated together with a solution of 42.7 g. (0.2 mol) of β - dimethylamino - propiophenone·HCl in 50 ml. of water on a water bath for 2 hours. The oily base which was produced was taken up in ether and converted to the HCl salt with isopropanolic HCl. Yield 13 g. Melting point 204–205° C. (recrystallized from ethanol).

EXAMPLE 11

1-[3-phenyl-propyl-(1)]-3-benzoyl-4-hydroxy-4-phenyl-piperidine 13.5 g. (0.1 mol) of 3-phenyl-propylamine-(1) dissolved in 20 ml. of ethanol and a solution of 42.7 g. (0.2 mol) of β-dimethylamino-propiophenone·HCl in 50 ml. of water were reacted and processed as in Example 10. The oily HCl salt which was obtained was caused to crystallize with ethyl acetate, washed with water and dried over $P_2O_5$. Yield 6 g. Melting point 149–150° C. (recrystallized from ethyl acetate).

EXAMPLE 12

1-[4-phenyl-butyl-(1)]-3-benzoyl-4-hydroxy-4-phenyl-piperidine 14.9 g. (0.1 mol) of 4-phenyl-butylamine-(1) dissolved in 20 ml. of ethanol and a solution of 42.7 g. (0.2 mol) of β-dimethylamino-propiophenone·HCl in 50 ml. of water were reacted and processed as in Example 11. Yield 5 g. Melting point 154–156° C. (recrystallized from ethyl acetate).

EXAMPLE 13 d,1-1-[2-(2-chloro - phenyl - 2 - hydroxy-ethyl-(1)]-3-(3-methoxy-benzoyl) - 4 - hydroxy-4-(3-methoxy-phenyl) piperidine

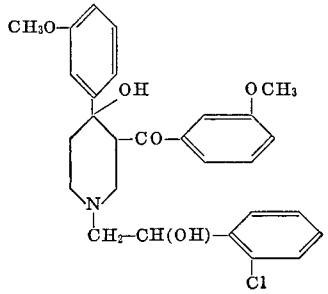

17.1 g. (0.1 mol) of d,l - 2 - (2-chloro-phenyl)-2-hydroxy-ethylamine dissolved in 25 ml. of ethanol and a solution of 48.7 g. (0.2 mol) of β-dimethylamino-3-methoxy-propiophenone; HCl in 50 ml. of water were reacted and processed as in Example 10. The oil HCl salt was caused to crystallize with methyl ethyl ketone. Yield 6 g. Melting point 185–186° C. (recrystallized from glacial acetic acid).

EXAMPLE 14

1-1-[1-phenyl-1-hydroxypropyl-(2)]-3-(4-methoxy-benzoyl)-4-hydroxy-4-(4-methoxy-phenyl)-piperidine 45 g. (0.14 mol) of 1-β-[1-phenyl-1-hydroxy-propyl-(2)-amino] - 4 - methoxy-propiophenone and 49 g. (0.2 mol) of β-dimethylamino-4-methoxy-propiophenone·HCl were allowed to react in Example 4(a). After acidification and evaporation the residue was dissolved in a mixture of dioxane methanol. Starting materials were removed by precipitation with ether and petroleum ether, the remaining solution concentrated and the residue crystallized from ethanol. Yield 3 g. Melting point 225–227° C.

EXAMPLE 15

1-1-[1-phenyl-1-hydroxy-propyl-(2)]-3-(3-methoxy-benzoyl)-4-hydroxy-4-phenyl-piperidine A solution of 28 g. (0.88 mol) of 1-β-[1-phenyl-1-hydroxy-propyl-(2)-amino]-propiophenone and 3-methoxy-acrylophenone (freshly prepared from 90 g. of β-dimethylamino-3-methoxy-propiophenone·HCl) in 800 ml. of chloroform was left at room temperature for 3 days. Then it was acidified with isopropanolic HCl and the starting material precipitated with ether. Petroleum ether was added to the filtrate to obtain a sirupy hydrochloride, which was dissolved in methanol, basified with 10% sodium hydroxide and was extracted with ether. The base crystallized by addition of petroleum ether to the extract. Yield 2 g. Melting point 120–121° C.

EXAMPLE 16 d,l-[2-(4-chlorophenyl)-2-hydroxy-ethyl]-3-benzoyl-4-hydroxy-4-phenyl-piperidine 42 g. (0.35 mol) of acetophenone, 10.5 g. (0.35 mol) of paraformaldehyde and 73 g. (0.35 mol) of d,l-2-(4-chlorophenyl)-2-hydroxy-ethylamine·HCl in 400 ml. isopropanol were refluxed for 2 hours, 21 g. (0.175 mol) of acetophenone and 8 g. (0.27 mol) of paraformaldehyde added and again refluxed for 2 hours. Petroleum ether precipitated a sirup which was washed with ether and dissolved in methanol. 45% aqueous NaOH and ether was added and vigorously shaken. The crude base was obtained by filtration. It was dissolved in acetone and isopropanolic HCl and filtered. The filtrate was concentrated and the residue caused to crystallize by addition of acetone. The crystalline product was extracted with methanol, the insoluble portion recrystallized from acetic acid. Yield 12 g. Melting point 200–202° C.

EXAMPLE 17 d,l-1-(2-phenyl-2-hydroxy-ethyl)-3-benzoyl-4-hydroxy-4-phenyl-piperidine 13,7 g. (0.1 mol) of d,l-2-phenyl-2-hydroxy-ethylamine and 42.6 g. (0.2 mol) of β-dimethylamino-propiophenone·HCl were reacted as in Example 4(a). After evaporation the basic residue was caused to crystallize with ether. A solution of the base in acetone was treated with HCl to precipitate the hydrochloride which was recrystallized from methanol. Yield 5 g. Melting point 194–195° C.

EXAMPLE 18 l-1-[1 - phenyl - 1 - hydroxy - propyl - (2)]-3-(4-chloro-benzoyl)-4-hydroxy-4-(4-chloro-phenyl)-piperidine 15.1 g. (0.1 mol) of 1-norephedrine and 62 g. (0.25 mol) of β - dimethylamino-4-chloropropiophenone·HCl were reacted as in Example 5. The layers were separated while warm, the benzene phase diluted with 200 ml. of acetone, dried and acidified with isopropanolic HCl. The resulting hydrochloride was recrystallized from ethanol. Yield 11 g. Melting point 194–195° C.

EXAMPLE 19 l-1-[1-phenyl-1-hydroxy-propyl-(2)]-3-(3-toluyl)-4-hydroxy-4-(3-tolyl)-piperidine 15.1 g. (0.1 mol) of 1-norephedrine and 56.9 g. (0.25 mol) of β - dimethylamino-3-methyl-propiophenone·HCl were reacted as in Example 5. The dry benzene phase was acidified with isopropanolic HCl, filtered and concentrated. The sirupy hydrochloride was chromatographed on a column of silica gel (CHCl₃:ethanol=95:5). The eluate was evaporated, the residue crystallized with acetone and recrystallized from acetone. Yield 2 g. Melting point 190–192° C.

EXAMPLE 20 l-1-[1-phenyl-1-hydroxy-propyl-(2)]-3-(4-toluyl)-4-hydroxy-4-(4-tolyl)piperidine 15.1 g. (0.1 mol) of 1-norephedrine and 45 g. (0.2 mol) of β - dimethylamino-4-methyl-propiophenone·HCl were reacted and processed as in Example 19. The hydrochloride crystallized from methyl ethyl ketone. Yield 5 g. Melting point 188–189° C.

EXAMPLE 21

1-1-[1-phenyl-1-hydroxy-propyl(2)-]-3-(4-fluoroben-zoyl)-4-hydroxy-4-(4-fluoro-phenyl)-piperidine 15.1 g. (0.1 mol) of 1-norephedrine and 57.7 g. (0.25 mol) of β - dimethyl-amino-4-fluoro-propiophenone·HCl were reacted and processed as in Example 19. Yield 3 g. Melting point 198–200° C.

EXAMPLE 22 d,l-1-[1-(4-chloro-phenyl) - 1 - hydroxy-propyl-(2)-3-(4-fluoro-benzoyl)-4-hydroxy-4-(4-fluoro-phenyl)-piperidine 18.5 g. (0.1 mol) of d,l-p-chloro-norephedrine and 46.3 g. (0.2 mol) of β - dimethylamino - 4 - fluoro-propiophenone·HCl were reacted as in Example 5. The dry benzene phase was acidified with isopropanolic HCl and the solvent distilled off. The residue was crystallized from acetone and recrystallized from ethanol. Yield 3 g. Melting point 204–205° C.

EXAMPLE 23 d,l-1-[2-(3-trifluoro-methyl-phenyl) - 2 - hydroxy-ethyl]-3-(3-methoxy-benzoyl) - 4 - hydroxy - 4 - (3-methoxyphenyl)-piperidine 28.7 g. (0.14 mol) of d,l-2-(3-trifluoromethyl-phenyl)-2-hydroxy-ethylamine and 68 g. (0.28 mol) of β-dimethylamino-3-methoxy-propiophenone·HCl were reacted as in Example 5. The dried benzene phase was acidified with isopropanolic HCl, the solvent distilled off and the residue crystallized from acetone. Yield 13 g. Melting point 188–189° C. (from isopropanol).

We claim:
1. A compound selected from the group consisting of substituted piperidines of the formula

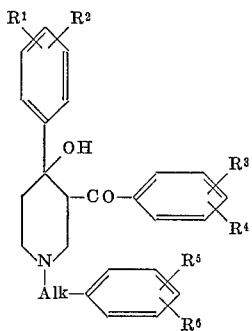

and their pharmaceutically acceptable acid addition salts wherein each of $R^1$–$R^6$ is selected from the group consisting of hydrogen, halogen, nitro, hydroxy, lower alkoxy, lower alkyl, and trifluoro methyl and each pair of $R^1$ and $R^2$, $R^3$ and $R^4$, and $R^5$ and $R^6$ on the individual phenyl rings when taken together are lower alkylene dioxy and Alk is selected from the group consisting of alkylene and hydroxy substituted alkylene of 2–4 carbon atoms.

2. A compound according to claim 1 which is d,l-1-[1-phenyl-propyl-(2)]-3-benzoyl-4-hydroxy-4-phenyl - piperidine.

3. A compound according to claim 1 which is l-1-[1-phenyl-1-hydroxy-propyl-(2)]-3-benzoyl-4 - hydroxy - 4-phenyl-piperidine.

4. A compound according to claim 1 which is l-1-[1-phenyl-1-hydroxy-propyl-(2)]-3-(3-methoxybenzoyl) - 4-hydroxy-4-(3-methoxyphenyl) piperidine.

5. A compound according to claim 1 which is d,l-1-[2-[benzodioxane-(1,4) - yl(6)] - 2 - hydroxy-ethyl]-3-(3-methoxybenzoyl)-4-hydroxy-4-(3-methoxyphenyl)-piperidine.

6. A compound according to claim 1 which is d,l,-1-[1-(3,4-dimethoxy)-phenyl-1-hydroxy-ethyl-(2)]-3-benzoyl-4-hydroxy-4-phenyl-piperidine.

7. A compound according to claim 1 which is 1-[3-phenyl-propyl-(1)]-3-benzoyl-4-hydroxy-4-phenyl - piperidine.

8. A compound according to claim 1 which is 1-[4-phenyl-butyl-(1)]-3-benzoyl-4-hydroxy-4-phenyl - piperidine.

9. A compound accordin to claim 1 which is d,l-1-[2-(2-chloro-phenyl-2-hydroxyethyl-(1)]-3-(3 - methoxy - benzoyl)-4-hydroxy-4-(3-methoxyphenyl)-piperidine.

10. A compound according to claim 1 wherein Alk is hydroxy substituted alkylene of 2–4 carbon atoms.

11. A compound according to claim 10 wherein $R_1$, $R_2$, $R_3$, $R_4$, $R_5$ and $R_6$ are hydrogen.

12. A compound according to claim 10 wherein $R_1$ is lower alkoxy or hydrogen, $R_2$ is hydrogen, $R_3$ is lower alkoxy or hydrogen, $R_4$ is hydrogen, $R_5$ is lower alkoxy, halogen or hydrogen, $R_6$ is lower alkoxy or hydrogen or $R_5$ and $R_6$ taken together are lower alkylene dioxy.

13. A compound according to claim 1 wherein Alk is alkylene of 2–4 carbon atoms and $R_1$, $R_2$, $R_3$, $R_4$, $R_5$ and $R_6$ are all hydrogen.

References Cited
UNITED STATES PATENTS 2,807,585   9/1957   Gardner et al. ____ 260—294.7J HENRY R. JILES, Primary Examiner
S. D. WINTERS, Assistant Examiner U.S. Cl. X.R.
260—294.7J, 294S, 590, 570.5C, 570.8R; 424—267

UNITED STATES PATENT OFFICE
CERTIFICATE OF CORRECTION

Patent No. 3,591,593           Dated July 6, 1971

Inventor(s) Kurt Thiele, Walter von Bebenburg & Klaus Posselt

It is certified that error appears in the above-identified patent and that said Letters Patent are hereby corrected as shown below:

Col. 5, line 64, change "4" to --5--.

Col. 5, line 64, after "ethyl" delete ")".

Col. 10, line 11, change "4" to --5--.

Signed and sealed this 29th day of February 1972.

(SEAL)
Attest:

EDWARD M. FLETCHER, JR.
Attesting Officer

ROBERT GOTTSCHALK
Commissioner of Patents